US007749158B2

(12) United States Patent
Enomoto

(10) Patent No.: US 7,749,158 B2
(45) Date of Patent: Jul. 6, 2010

(54) ELECTRONIC ENDOSCOPE

(75) Inventor: Takayuki Enomoto, Saitama (JP)

(73) Assignee: Hoya Corporation, Tokyo (JP)

( * ) Notice: Subject to any disclaimer, the term of this patent is extended or adjusted under 35 U.S.C. 154(b) by 1051 days.

(21) Appl. No.: 11/195,811

(22) Filed: Aug. 3, 2005

(65) Prior Publication Data
US 2006/0038882 A1 Feb. 23, 2006

(30) Foreign Application Priority Data
Aug. 6, 2004 (JP) ............................ P2004-230368

(51) Int. Cl.
A61B 1/00 (2006.01)
(52) U.S. Cl. ........................................ 600/118; 348/65
(58) Field of Classification Search ................ 600/109, 600/112, 117, 118, 132, 136, 160, 178; 348/65, 348/68–75
See application file for complete search history.

(56) References Cited

U.S. PATENT DOCUMENTS

| 5,951,462 | A  | * | 9/1999  | Yamanaka ................ 600/118 |
| 6,313,868 | B1 | * | 11/2001 | D'Alfonso et al. ............ 348/72 |
| 6,319,198 | B1 |   | 11/2001 | Takahashi |
| 6,436,032 | B1 | * | 8/2002  | Eto et al. ..................... 600/117 |
| 6,638,212 | B1 | * | 10/2003 | Oshima ....................... 600/109 |
| 6,697,101 | B1 |   | 2/2004  | Takahashi et al. |
| 6,712,756 | B1 | * | 3/2004  | Kura et al. .................. 600/118 |
| 6,715,068 | B1 |   | 3/2004  | Abe |
| 6,976,954 | B2 | * | 12/2005 | Takahashi .................... 600/118 |
| 6,981,941 | B2 | * | 1/2006  | Whitman et al. ............... 600/1 |
| 7,001,330 | B2 | * | 2/2006  | Kobayashi ................... 600/118 |
| 7,033,316 | B2 | * | 4/2006  | Takahashi .................... 600/118 |
| 2001/0002842 | A1 | * | 6/2001  | Ozawa .......................... 348/45 |
| 2002/0188173 | A1 | * | 12/2002 | Kobayashi ................... 600/118 |
| 2003/0142205 | A1 | * | 7/2003  | Takahashi et al. ............. 348/65 |
| 2003/0160865 | A1 | * | 8/2003  | Takahashi ..................... 348/65 |
| 2003/0174205 | A1 | * | 9/2003  | Amling et al. ................. 348/65 |
| 2005/0177023 | A1 | * | 8/2005  | Abe ........................... 600/101 |

FOREIGN PATENT DOCUMENTS

| JP | 8-110485    | 4/1996  |
| JP | 8-123518    | 5/1996  |
| JP | 2000-245681 | 9/2000  |
| JP | 2000-245682 | 9/2000  |
| JP | 2000-284957 | 10/2000 |

* cited by examiner

Primary Examiner—John P Leubecker
Assistant Examiner—Samuel Candler
(74) Attorney, Agent, or Firm—Greenblum & Bernstein P.L.C.

(57) ABSTRACT

An electronic endoscope has a video-scope with an image sensor and a video-processor. The electronic endoscope has a first memory, a second memory, and a program data transmitter. The first memory is provided in the video-scope, and is capable of storing program data associated with an operation of the video-processor. The second memory is provided in the video-processor, and is capable of storing the program data. The program data transmitter according to the present invention is capable of transmitting the program data from the first memory to the second memory in a situation where the videoscope is connected to the video-processor.

19 Claims, 4 Drawing Sheets

ELECTRONIC ENDOSCOPE

BACKGROUND OF THE INVENTION

1. Field of the Invention

The present invention relates to an electronic endoscope having a video-scope and a video-processor, especially, it relates to a program that operates and controls the video-processor.

2. Description of the Related Art

In an electronic endoscope, firmware, stored in a volatile memory such as a ROM, controls signal processes to display/record an object image, and further controls peripheral devices such as printers and recorders. When a new version of the firmware is needed to up grade the performance or add a new function, an existing incorporated ROM is exchanged for a new ROM with a new version of the firmware, or a program is updated by transmitting a program data from a computer to the electronic endoscope.

SUMMARY OF THE INVENTION

An object of the present invention is to provide an electronic endoscope that effectively appends or up grades a program associated with the operation of the electronic endoscope without troublesome work.

An electronic endoscope according to the present invention has a video-scope with an image sensor and a video-processor. Various types of video-scopes are respectively connectable to the video-processor, each video-scope having a specific function.

The electronic endoscope of the present invention has a first memory, a second memory, and a program data transmitter. The first memory is provided in the video-scope, and is capable of storing program data associated with an operation of the video-processor. For example, the program data is associated with a function of a connected video-scope, and is program data that is necessary when the electronic endoscope performs the video-scope function. The second memory is provided in the video-processor, and is capable of storing the program data.

The program data transmitter according to the present invention is capable of transmitting the program data from the first memory to the second memory in a situation where the video-scope is connected to the video-processor. The video-processor is capable of effectively carrying out a process, such as a new observation process, a new photographing process, and so on, by using the transmitted program data. For example, the program data could be program data for carrying out a normal observation, operation, program data for carrying out an auto-fluorescence observation operation, program data for carrying out an ultrasonic endoscope operation, or program data for carrying out a cofocal endoscope operation. Also, the program data may include all or just some of the above types of program data.

When program data that applies a new function to the electronic endoscope is special program, and the function is not used frequently, the operation corresponding to the program data may be carried out every time the program data is transmitted. For example, the second memory may be volatile memory. On the other hand, if the operation carried out by the program data is frequently used, the video-processor may carry out the process corresponding to the program data regardless of the connected video-scope. For example, a third memory being a nonvolatile memory, is provided in the video-processor, and a detector that detects a number of transmitting-times of the program data, is provided. The program data transmitter may store the program data in the third memory when the number of transmitting-times exceeds a given number. When plural program data is prepared in the video-scope, only necessary program data may be transmitted to the video-processor. For example, a selection screen displayer that displays a selection screen indicating plural program data stored in the first memory is provided, the content of any program being different to that of any other program. Then, a setting processor that sets one program data from the plural program data in accordance with the setting-operation of an operator, is provided. The program data transmitter transmits the set program data from the first memory to the second memory.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
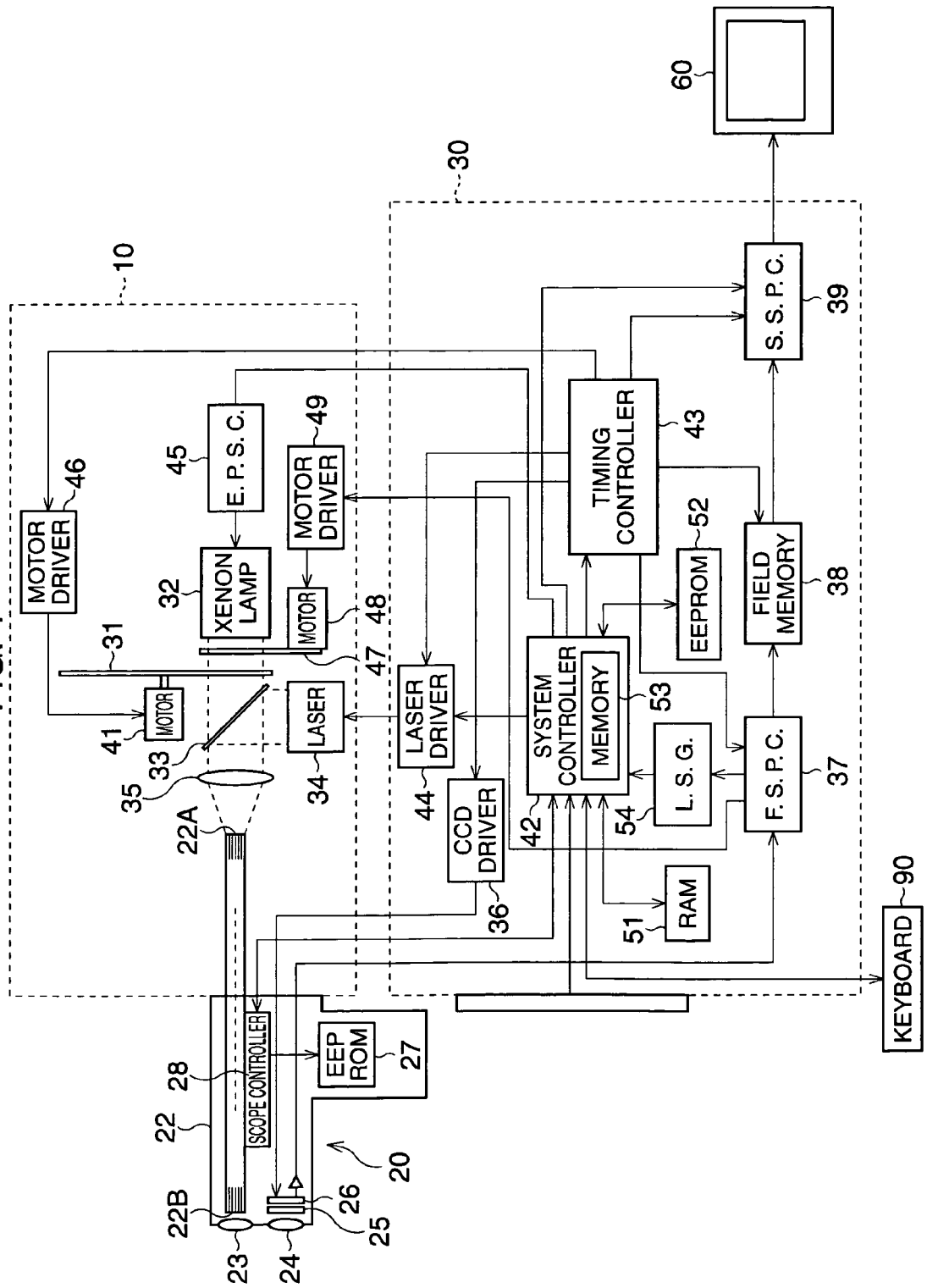
FIG. 1 is a block diagram of an electronic endoscope according to the present embodiment.

FIG. 1 is a block diagram of an electronic endoscope according to the present embodiment.

The electronic endoscope has a light source unit 10, a video-scope 20, and a video-processor 30. The video-scope 20 is connected to the light source unit 10 and the video-processor 30. A monitor 60 and a keyboard 90 are connected to the video-processor 30.

The light source unit 10 has a xenon lamp 32 and a laser 34. In a normal-observation mode, a normal full color image is displayed by using the xenon lamp 32. In an auto-fluorescence observation mode, an auto-fluorescence observation image is displayed by using the laser 34. Herein, the video-processor 30 is a video-processor for normal observation, and program data for carrying out the auto-fluorescence imaging is not stored in the video-processor in manufacturing.

A firmware program that enables the video-processor 30 to perform the auto-fluorescence observation is stored in the video-scope 20. As described later, in a situation where the video-scope 20 is connected to the light source unit 10 and the video-processor 30, the program in the video-scope 20 is transmitted to the video-processor 30, so that the normal-observation and the auto-fluorescence observation can be performed.

In the case of the normal observation, a light emitted from the xenon lamp 32 enters the incidence surface 22A of a light-guide 22 via a stop 47, a dichroic mirror 33, and a condenser lens 35. The light-guide in the video-scope is a fiber-optic bundle directing the light to a tip end of the video-scope 20. The light exits from the end portion 22B of the light-guide 22, and illuminates an observed object via a diffusion lens 23.

Light, reflected on the object, reaches a CCD 26 via an object lens 24 and an excitation-light filter 25, so that an object image is formed on the photo-sensitive area of the CCD 26. A color filter, checkered by four color elements of Yellow (Y), Magenta (M), Cyan (C), and Green (G), is arranged on the photo-sensitive area such that the four color elements are opposite to pixels arranged in the photo-sensitive area. Based on the light passing through each color element, analog image-pixel signals are generated by the photoelectric transformation effect.

The generated image-pixel signals are read from the CCD 26 at regular time intervals in accordance with clock pulse signals output from a CCD driver 36. Herein, the NTSC standard is applied as the TV standard, accordingly, one field worth of image signals is read from the CCD 26 at a 1/60 second time interval and is then fed to a first signal processing circuit 37. Note that, for the color imaging method using an on-chip color filter, a so called "color difference lines sequential system" is applied.

In the first signal processing circuit 37, various processes, such as an amplifying process, a white balance process, and soon, are performed for the image-pixel signals, so that digital image signals are generated and are fed to a field memory 38. The digital image signals temporarily stored in the field memory 38 are read at a given timing, and are fed to a second signal processing circuit 39. In the second signal processing circuit 39, video signals are generated and output to the monitor 60 so that the observed image is displayed on the monitor 60.

On the other hand, when the auto-fluorescence observation mode is selected by operating the keyboard 90, the laser 34 and the xenon lamp 32 alternately emit light. The xenon lamp 32 emits normal illuminating light (white light), whereas the laser 34 intermittently emits excitation-light at a constant time interval (herein, 1/60 (s)) in accordance with the NTSC method. The laser emits light having a wave-length range corresponding to a blur color and ultraviolet rays. The excitation-light is reflected on the dichroic mirror 34 and enters the incidence surface 22A of the light-guide 22.

A rotating filter 31 is a chopper that periodically interrupts the light emitted from the xenon lamp 32. A U-shaped aperture (not shown) is formed along the circumferential direction of the rotating filter 31, the aperture extending over the half circumferential length. The rotating filter 31 is rotated at a constant speed by a motor 41 so as to alternately repeat the interrupting and passing of the light in accordance with the NTSC standard (1/60 (s)). By adjusting the emitting-timing of the laser 34 in accordance with the rotation of the rotating filter 31, the excitation-light and the normal illuminating light illuminate the object alternately.

When the excitation-light illuminates the object, auto-fluorescence is generated by an object organism due to the excitation-light, and the auto-fluorescence reaches the CCD 26. On the other hand, the excitation-light reflected by the object is interrupted by an excitation-light filter 25, which is arranged in the front of the CCD 26. Thus, an object image is formed on the CCD 26 by the auto-fluorescence. The CCD 26 is a high-sensitive image sensor, such as CMD (Charge Multiplying Detector). The image-pixel signals corresponding to the auto-fluorescence with a week light-intensity are amplified greatly.

The excitation-light and the normal illuminating light are alternately emitted in each one field time interval, so that image-pixel signals for the normal observation and image-pixel signals for auto-fluorescence observation are read from the CCD 26 alternately and are alternately subjected to various processes in the first signal processing circuit 37. In the second signal processing circuit 39, a signal process for displaying the auto-fluorescence observation image and the normal observation image are simultaneously, displayed on a screen of the monitor 60.

A system controller 42 with a memory 53 controls each circuit and the light source unit 10, and then outputs control signals to a laser driver 44 for driving the laser 34, a lamp power supplying circuit 45 for supplying electric power to the lamp 32, a motor driver 46 for driving the motor 41, a timing controller 43 for adjusting a signal process timing of each circuit, and so on. A program data associated with an operation of the video-processor 30 and a program for performing the transmission of program data are stored in an EEPROM (Electronic Erasable Programmable ROM) 52, which is an erasable nonvolatile memory.

A scope controller 28 for controlling the video-scope 20 and an EEPROM 27 are provided in the video-scope 20, the scope controller 28 controls the reading and writing of data in the EEPROM 27. In the EEPROM 27, new application program data based on the efficiency of the connected video-scope 20 is stored. The program data appends or adds a new function performed by the video-processor 30. Herein, program data for auto-fluorescence observation, program data for an ultrasonic endoscope, and a program for a confocal endoscope are stored in the EEPROM 27. A RAM 51 of volatile memory is provided in the video-processor 30 to store these program data.

To add a new function to the video-processor 30, as described later, a given operation is performed to the keyboard 90. Display-data associated with a displaying of a list is stored in the EEPROM 27 of the video-scope 20. When the list is displayed on the monitor 60 on the basis of the display-data transmitted to the video-processor 30, the operator operates the keyboard 90 to select program data to be incorporated in the video-processor 30 while viewing the screen of the monitor 60. Then, selected program data is transmitted from the video-scope 20 to the video-processor 30.

In the luminance signal generator 54, luminance signals are generated in accordance with image-pixel signals read from the CCD 26 at 1/60 (s) time intervals. The system controller 42 outputs control signals to a motor driver 49 on the basis of the luminance signal. The motor driver 49 drives a motor 48 so that the stop 47 opens/closes by a given amount to adjust the brightness of the displayed object image.

Figure 2:
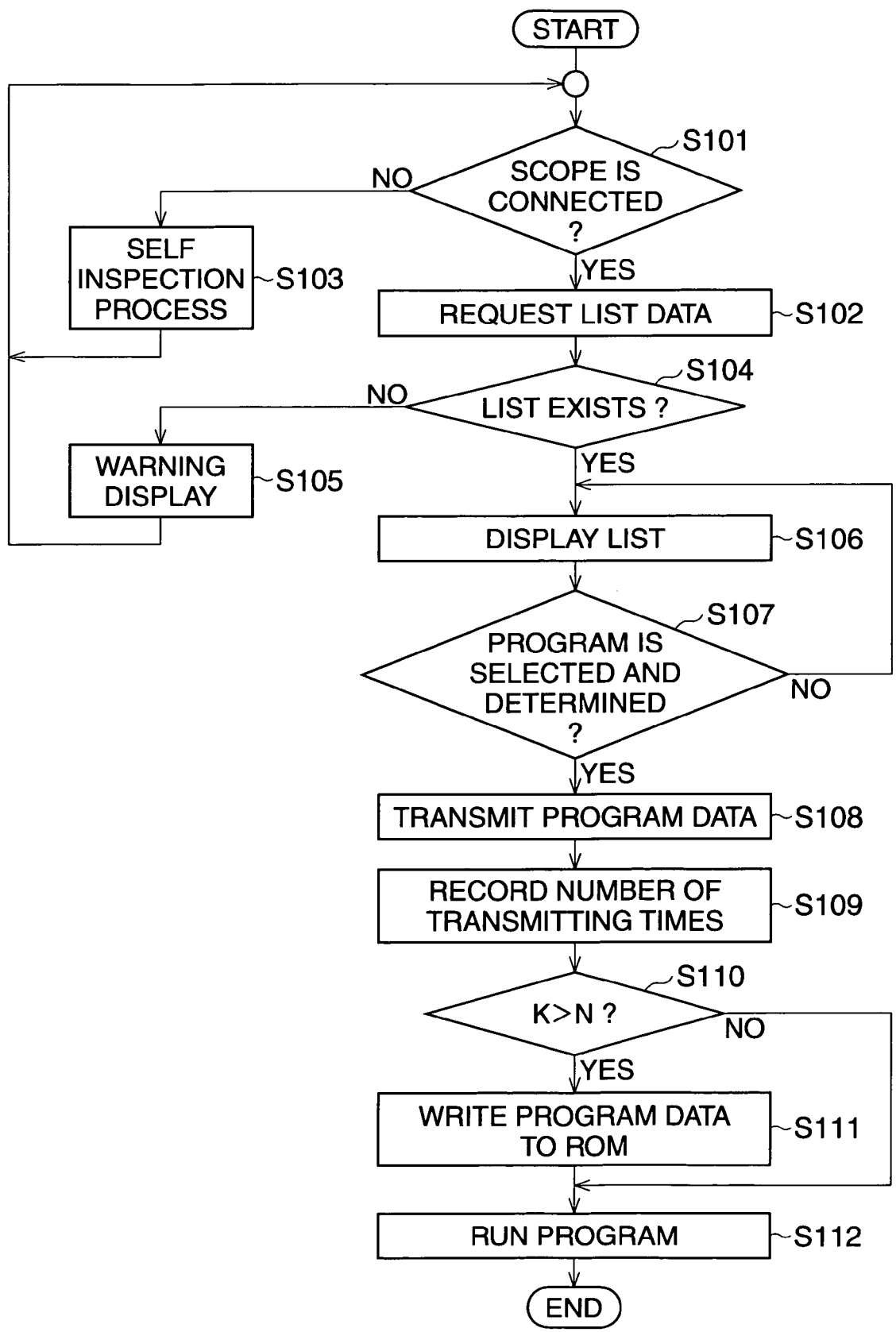
FIG. 2 is a flowchart of a program data transmitting process performed by the system controller.
Figure 3:
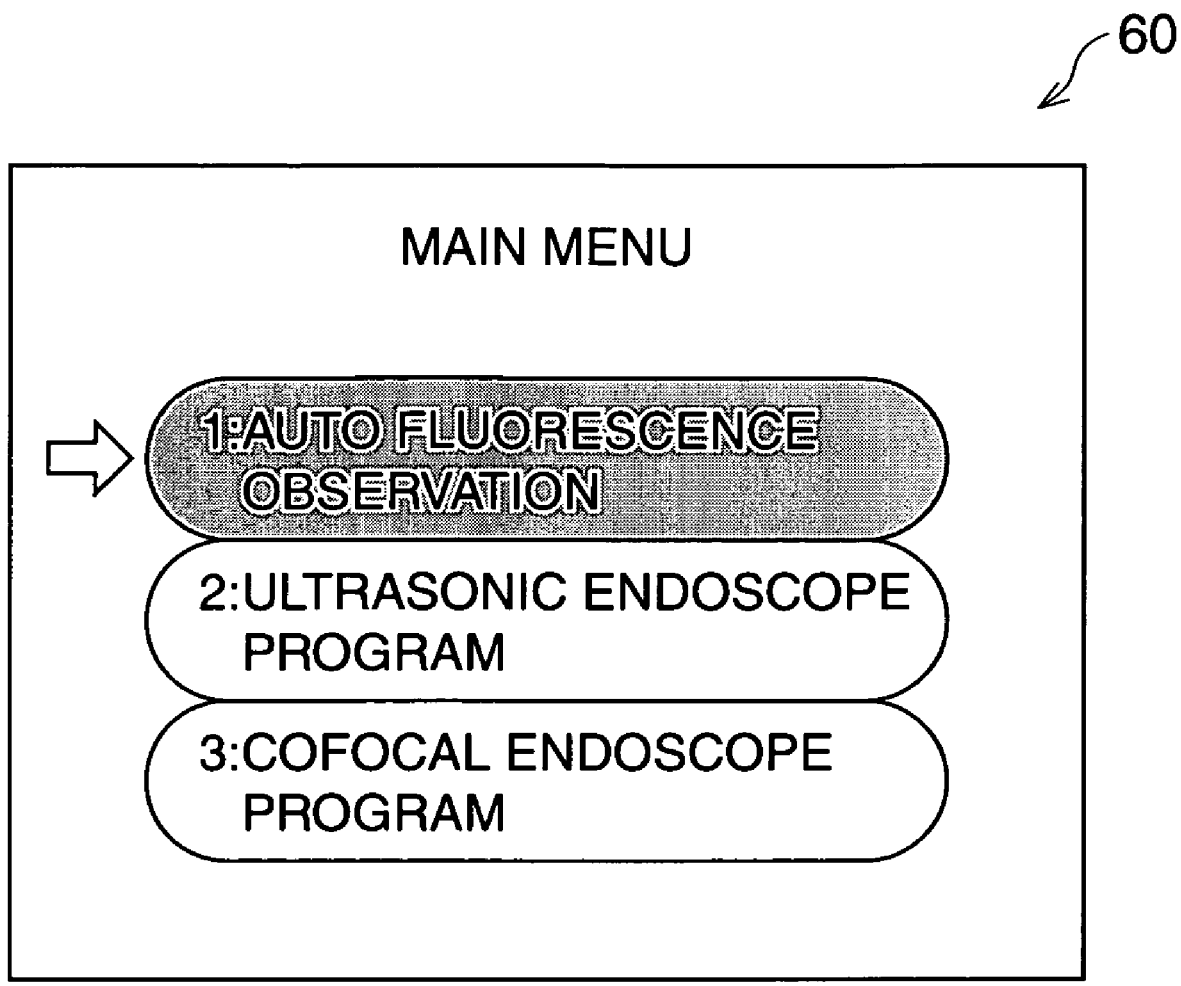
FIG. 3 is a view showing a screen displaying a main menu of a program list.
Figure 4:
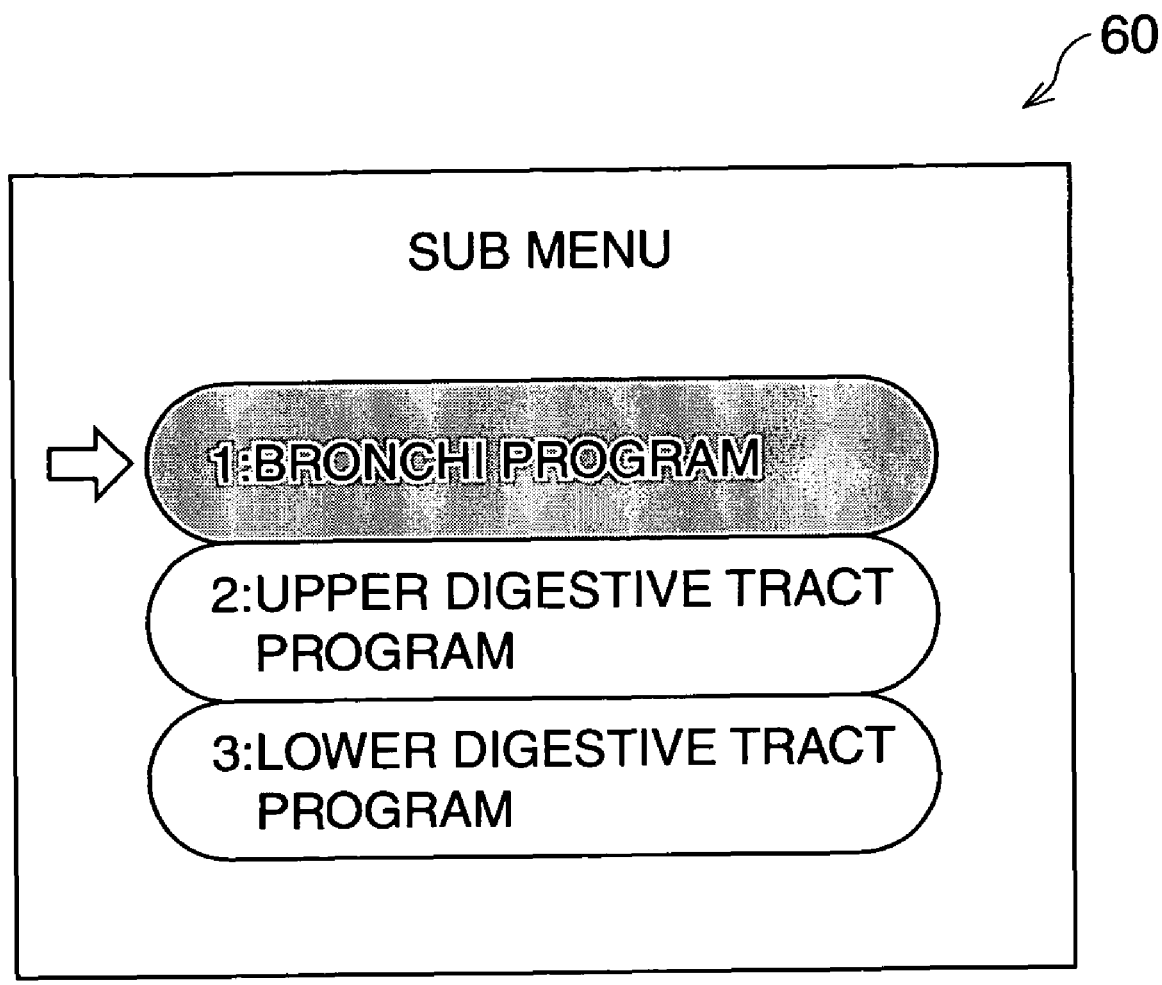
FIG. 4 is a view showing a screen displaying a sub menu of a program list.

FIG. 2 is a flowchart of a program data transmitting process performed by the system controller 42. FIG. 3 is a view showing a screen displaying a main menu of a program list. FIG. 4 is a view showing a screen displaying a sub menu of a program list.

In Step S101, it is determined whether the video-scope 20 is connected to the video-processor 30. When it is determined that the video-scope 20 is not connected to the video-processor 30, the process goes to Step S103, wherein a self-inspection process is performed. On the other hand, when it is determined that the video-scope 20 is connected to the video-processor 30, the process goes to Step S102. In Step S102, a command data for reading list data in the EEPROM 27 is transmitted from the video-processor 30 to the video-scope 20 to display a list of application programs. After Step S102 is performed, the process goes to Step S104.

In Step S104, it is determined whether the list data exists in the EEPROM 27 on the basis of response data from the video-scope 20. When it is determined that the list data does not exist in the EEPROM 27, the process goes to Step S105, wherein a screen that urges the operator to insert the video-scope 20, is displayed on the monitor 60. On the other hand, when it is determined that the list data exists in the EEPROM 27, the process goes to Step S106, wherein a list display process is performed. Namely, the signal process is performed in the second signal processing circuit 39 so as to display the list of application programs. Thus, the list of application programs shown in FIGS. 3 and 4 is displayed.

An auto-fluorescence observation program is a program that controls the driving of the laser 34 and the rotating of the rotating filter 31. An ultrasonic endoscope program is a program that performs a new scanning function. A cofocal endoscope program is a program that controls a drive of an optical system provided in the cofocal endoscope with a zooming function. The highest rank program (herein, the auto fluorescence observation program) is the default program. When one program is selected and determined by operating the keyboard 90, as shown in FIG. 4, a sub menu screen is displayed. Herein, a screen for selecting a type of the video-scope is displayed. After Step S106 is performed, the process goes to Step S107.

In Step S107, it is determined whether the operator has selected and determined a program, or a given time has passed in a situation where the default program is selected. When it is determined that the operator has not selected and determined a program, or a given time has not passed, the process returns to Step S106.

On the other hand, when it is determined that the operator has selected and determined a program, or a given time has passed in a situation where the default program is selected, the process goes to Step S108, wherein command data to transmit selected and determined program data from the EEPROM 27 to the video-processor 30, is fed from the system controller 42 to the scope controller 28. The selected and determined program data is stored in RAM 51, and is loaded in the RAM 51. After Step S108, the process goes to Step S109.

In Step S109, the number of transmitting times according to the selected and determined program data is counted. Various types of video-scopes are connected to the video-processor 30 one after another while the electronic endoscope is utilized. In the process, specific program data (for example, the auto-fluorescence observation program) required by the operator is transmitted to the video-processor 30 repeatedly while using various video-scopes. In Step S110, it is determined whether the number of transmitting times according to the selected and determined program data "K" exceeds a given number of times "N" (For example, N=4). Namely, it is determined whether the selected and determined program data is used frequently. When it is determined that the number of transmitting times according to the selected and determined program data "K" exceeds a given number of times "N", the process goes to Step S111, wherein the program data in the RAM 51 that is transmitted from the video-scope 20 is written to the EEPROM 52. After Step S111 is performed, the process goes to Step S112. On the other hand, when it is determined that the number of transmitting times according to the selected and determined program data "K" does not exceed a given number of times "N", the process goes to Step S112.

In Step S112, the loaded program data in the RAM 51 is activated to operate the video-processor 30. Namely, the drive of the laser 34 and the rotating filter 41 is controlled, and a signal process is controlled.

In this way, in this embodiment, program data is stored in the EEPROM 27 provided in the video-scope 20. When the operator selects program data, the selected and determined program data is transmitted from the EEPROM 27 to the RAM 51. Thus, a new function corresponding to the connected video-scope can be implemented by only connecting the video-scope with the new function to a video-processor that did not have a program to support the video-scope with a new function. Further, as only program data that is used frequently is written in the ROM 52, unnecessary programs are not stored in the video-processor.

A new version of a program for the normal observation may be transmitted to the video-processor instead of an application program. Also, program data that controls peripheral apparatus may be transmitted to the video-processor. Note, a program is not restricted to a firmware program.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-230368 (filed on Aug. 6, 2004), which is expressly incorporated herein, by reference, in its entirety.

The invention claimed is:

1. An electronic endoscope having a video-scope with an image sensor and a video-processor, said electronic endoscope comprising:

a first memory that is provided in said video-scope and is configured to store a program associated with an operation of said video-processor, the program executing an observation operation to display an endoscope image by controlling the video-processor;

a second memory that is provided in said video-processor and is configured to store the program;

a third memory that is a nonvolatile memory and is provided in said video-processor;

a program transmitter that is configured to transmit the program from said first memory to said second memory upon said video-scope being connected to said video-processor, wherein the video processor performs the observation operation that is executed by the program transmitted from the first memory, the observation operation executed by the program not being previously executable by the video processor; and a detector that detects a number of times that the program has been transmitted, wherein said program transmitter further transmits the program stored in said second memory to said third memory in response to the detected number of transmitting-times exceeding a predetermined number.

2. The electronic endoscope of claim 1, wherein the program is at least one of a program that executes a normal observation operation, a program that executes an auto-fluorescence observation operation, a program that performs an ultrasonic endoscope operation, and a program that executes a confocal endoscope operation.

3. The electronic endoscope of claim 1, wherein said second memory comprises a volatile memory and said program transmitter transmits the program to the video processor for a new observation operation, associated with the connected video-scope, the new observation operation not having been implemented in the video processor.

4. The electronic endoscope of claim 1, further comprising:

a selection screen displayer that displays a selection screen indicating plural programs stored in said first memory, the content of each program of the plural programs being different from every other program of the plural programs; and a setting processor that sets one program of the plural programs in accordance with a setting-operation of an operator, wherein said program transmitter transmits the set program from said first memory to said second memory.

5. The electronic endoscope according to claim 1, connection of the video-scope to the video processor enabling the video processor to execute a new function based upon the transmitted program.

6. A video-processor connectable to a video-scope with a first memory that is configured to store a program associated with an operation of said video-processor, the program executing an observation operation to display an endoscope image by controlling the video-processor, the video processor comprising:
  a second memory that is provided in said video-processor and is configured to store the program;
  a third memory that is a nonvolatile memory and is provided in said video-processor;
  a program transmitter that is configured to transmit the program from the first memory to said second memory upon the video-scope being connected to said video-processor, wherein the video processor performs the observation operation that is executed by the program transmitted from the first memory, the observation operation executed by the program not being previously executable by the video processor; and
  a detector that detects a number of times that the program has been transmitted;
  wherein said program transmitter further transmits the program stored in said second memory to said third memory in response to the detected number of transmitting-times exceeding a predetermined number.

7. The video processor according to claim 6, wherein the program is at least one of a program that executes a normal observation operation, a program that executes an auto-fluorescence observation operation, a program that performs an ultrasonic endoscope operation, and a program that executes a confocal endoscope operation.

8. The video processor according to claim 6, wherein said second memory comprises a volatile memory and said program transmitter transmits the program to the video processor for a new observation operation, associated with the connected video-scope, the new observation operation not having been implemented in the video processor.

9. The video processor according to claim 6, connection of the video-scope to the video processor enabling the video processor to execute a new function based upon the transmitted program.

10. The video processor according to claim 6, further comprising:
  a selection screen displayer that displays a selection screen indicating plural programs stored in the first memory, the content of each program of the plural program being different from the program of every other program of the plural programs; and
  a setting processor that sets one program of the plural programs, in accordance with a setting operation of an operator,
  wherein the program transmitter transmits the set program from the first memory to the second memory.

11. An apparatus for transmitting a program associated with an electronic endoscope, the apparatus comprising:
  a scope detector that detects whether a video-scope, having a first memory that is configured to store a program associated with an operation of a video-processor, is connected to the video-processor, the program executing an observation operation to display an endoscope image by controlling the video-processor;
  a program transmitter that is configured to transmit the program from the first memory to a second memory that is provided in the video-processor and is capable of storing the program, upon the video-scope being connected to the video-processor, wherein the video processor performs the observation operation that is executed by the program transmitted from the first memory, the observation operation executed by the program not being previously executable by the video processor; and
  a detector that detects a number of times that the program has been transmitted;
  wherein the program transmitter further transmits the program stored in the second memory to a non-volatile third memory provided in the video-processor in response to the detected number of transmission times exceeding a predetermined number.

12. The apparatus according to claim 11, wherein the program is at least one of a program that executes a normal observation operation, a program that executes an auto-fluorescence observation operation, program that performs an ultrasonic endoscope operation, and a program that executes a confocal endoscope operation.

13. The apparatus according to of claim 11, wherein said second memory comprises a volatile memory and said program transmitter transmits a program to the video processor for a new observation operation, associated with the connected video-scope, the new observation operation not having been implemented in the video processor.

14. The apparatus according to claim 11, connection of the video-scope to the video processor enabling the video processor to execute a new function based upon the transmitted program.

15. The apparatus according to claim 11, further comprising:
  a selection screen displayer that displays a selection screen indicating plural programs stored in the first memory, the content of each program of the plural programs being different from every other program of the plural programs; and
  a setting processor that sets one program of the plural programs in accordance with a setting operation of an operator,
  wherein the program transmitter transmits the set program from the first memory to the second memory.

16. A computer readable medium that stores a program for transmitting a program associated with an electronic endoscope, the computer readable medium comprising:
  a scope detecting segment that detects whether a video-scope, having a first memory that is capable of storing a program associated with an operation of a video-processor, is connected to the video-processor, the program executing an observation operation to display an endoscope image by controlling the video-processor; and
  a program transmitting segment that is capable of transmitting the program from the first memory to a second memory that is provided in the video-processor and is capable of storing the program, upon the video-scope being connected to the video-processor, wherein the video processor performs the observation operation that is executed by the program transmitted from the first memory, the observation operation executed by the program not being previously executable by the video processor; and
  a detecting segment that detects a number of times that the program has been transmitted from the first memory to the second memory;

wherein said program transmitting segment further transmits the program stored in the second memory to a third memory in response to the detected number of transmitting-times exceeding a predetermined number, the third memory being a non-volatile memory provided on the video-processor.

17. The computer readable medium according to claim 16, wherein the program is at least one of a program that executes a normal observation operation, a program that executes an auto-fluorescence observation operation, a program that performs an ultrasonic endoscope operation, and a program that executes a confocal endoscope operation.

18. The computer readable medium according to claim 16, wherein said second memory comprises a volatile memory and said program transmitting segment transmits the program to the video processor for a new observation operation, associated with the connected video-scope, the new observation operation not having been implemented in the video processor.

19. The computer readable medium according to claim 16, connection of the video-scope to the video processor enabling the video processor to execute a new function based upon the transmitted program.

* * * * *